US010819192B2

(12) United States Patent
Gurr et al.

(10) Patent No.: US 10,819,192 B2
(45) **Date of Patent: *Oct. 27, 2020**

(54) HANDHELD WORK APPARATUS HAVING AN ELECTRIC MOTOR

(71) Applicant: Andreas Stihl AG & Co. KG, Waiblingen (DE)

(72) Inventors: Kay-Steffen Gurr, Heilbronn (DE); Gernot Liebhard, Waiblingen (DE); Matthias Mueller, Schorndorf (DE); Joachim Kolb, Ludwigsburg (DE)

(73) Assignee: Andrea Stihl AG & Co. KG, Waiblingen (DE)

( * ) Notice: Subject to any disclaimer, the term of this patent is extended or adjusted under 35 U.S.C. 154(b) by 614 days.

This patent is subject to a terminal disclaimer.

(21) Appl. No.: 15/461,415

(22) Filed: Mar. 16, 2017

(65) Prior Publication Data

US 2017/0271963 A1 Sep. 21, 2017

(30) Foreign Application Priority Data

Mar. 16, 2016 (DE) ........................ 10 2016 003 150

(51) Int. Cl.

*H02K 11/33* (2016.01)
*B25F 5/00* (2006.01)
*H01R 12/58* (2011.01)
*H01R 13/20* (2006.01)

(52) U.S. Cl.

CPC ................ *H02K 11/33* (2016.01); *B25F 5/00* (2013.01); *H01R 12/58* (2013.01); *H01R 13/20* (2013.01)

(58) Field of Classification Search

CPC .... H02K 11/33; H02K 11/30; H02K 2201/03; H02P 1/02; H02P 3/02; H02P 29/00; H01R 12/58; H01R 13/20; B25F 5/00; B25F 5/02; B25C 1/06

See application file for complete search history.

(56) References Cited

U.S. PATENT DOCUMENTS 4,328,405 A * 5/1982 Cuneo .................... H01H 13/08 200/243
4,348,603 A * 9/1982 Huber .................... H01H 9/063 173/48
5,200,657 A * 4/1993 Prestel ................... H01H 9/061 310/50
6,749,028 B1 6/2004 Chan et al.

(Continued)

*Primary Examiner* — Thanh K Truong
*Assistant Examiner* — Katie L Gerth
(74) *Attorney, Agent, or Firm* — Walter Ottesen, P.A.

(57) ABSTRACT

A handheld work apparatus has an electric motor for driving a tool. A function module is to be connected to a battery pack via electrical contacts, there being provided an electrical operating switch, for putting the electric motor into operation, which is coupled to an actuating element of the handheld work apparatus. The electric motor is put into operation upon a command of the operating switch, via a control unit. To constitute the function module, provision is made to dispose the electrical contacts, the control unit and the operating switch on a common carrier. The carrier has a first side that faces toward the battery pack, and at least one second side that faces away from the battery pack. The electrical contacts are provided on the first side of the carrier, while the operating switch is held on the second side of the carrier.

15 Claims, 3 Drawing Sheets

(56) References Cited

U.S. PATENT DOCUMENTS 7,313,001 B2 * 12/2007 Broghammer ......... H01H 9/061 361/700
7,679,300 B2 3/2010 Miyaura et al.
8,446,120 B2 5/2013 Forster et al.
8,810,085 B2 * 8/2014 Matsunaga ............ H02K 11/33 310/50
9,248,563 B2 * 2/2016 Allner ....................... B25F 5/02
2002/0158593 A1 * 10/2002 Henderson ................ H02P 3/12 318/375
2006/0009053 A1 * 1/2006 Broghammer ......... H05K 3/303 439/83
2006/0202571 A1 * 9/2006 Wilkinson ................ B25F 5/02 310/50
2007/0079980 A1 * 4/2007 Kononenko ......... H02K 11/225 173/90
2007/0256914 A1 * 11/2007 Lohr ....................... B25B 23/18 200/5 A
2010/0221594 A1 * 9/2010 Ro kamp ............... A01G 3/053 429/100
2012/0067608 A1 * 3/2012 Heinzelmann ............ B25F 5/02 173/217
2012/0234657 A1 * 9/2012 Nishikimi ................ H01H 9/04 200/302.2
2012/0292063 A1 * 11/2012 Forster ...................... B25F 5/00 173/18
2012/0292070 A1 * 11/2012 Ito .......................... H02K 5/225 173/217
2013/0002175 A1 * 1/2013 Shimizu .................... B25F 5/02 318/139
2013/0119792 A1 * 5/2013 Nishimiya .............. B25F 5/008 310/50
2013/0193891 A1 * 8/2013 Wood ........................ B25F 5/00 318/434
2013/0313925 A1 * 11/2013 Mergener ............... H02K 29/08 310/50
2014/0139055 A1 * 5/2014 Oomori ................... B25F 5/008 310/50
2014/0151079 A1 * 6/2014 Furui ........................ B25F 5/02 173/46
2015/0279592 A1 10/2015 Ekstrom et al.
2015/0280516 A1 * 10/2015 Ekstrom ................... B25F 5/00 173/93
2016/0046011 A1 * 2/2016 Ogle ....................... B24B 23/02 173/1
2017/0273209 A1 * 9/2017 Gurr ......................... B25F 5/02

* cited by examiner

HANDHELD WORK APPARATUS HAVING AN ELECTRIC MOTOR

CROSS REFERENCE TO RELATED APPLICATION

This application claims priority of German patent application no. 10 2016 003 150.6, filed Mar. 16, 2016, the entire content of which is incorporated herein by reference.

FIELD OF THE INVENTION

The invention relates to a handheld work apparatus that has an electric motor for driving a tool.

BACKGROUND OF THE INVENTION

Electrical contacts are provided for electrical connection to a battery pack, an electrical operating switch being disposed for putting the electric motor into operation. The operating switch is coupled to an actuating element that is to be actuated on the work apparatus by the user. Following closure of the operating switch, the electric motor is put into operation via a control unit.

The operating switch of a battery-operated work apparatus is usually disposed on or near a manual actuating element of the work apparatus. The operating switch is connected at its mounting location, via electrical lines, both to the power terminal of the battery pack and to the control unit for the purpose of putting the electric motor into operation. The connection of the electrical lines to the operating switch, to the battery pack and to the control unit is usually effected via cable lugs, which can corrode over the course of the operating period, and which are a source of electrical faults.

SUMMARY OF THE INVENTION

It is an object of the invention to provide a handheld work apparatus, having an operating switch, and having an electric motor for driving a tool, in such a manner that the fault sources that are possible with an electrical wiring are minimized.

The object can, for example, be achieved by a handheld work apparatus having: an electric motor configured to drive a work tool; a plurality of electrical contacts configured to establish an electrical connection to a battery pack; an electric operating switch configured to start the electric motor; an actuating member coupled to the operating switch; a control unit for operating the electric motor; a carrier; the electrical contacts, the control unit and the operating switch being jointly arranged on the carrier; the carrier having a first side facing the battery pack and at least one second side facing away from the battery pack; the electrical contacts being provided on the first side of the carrier; and, the operating switch being held on the second side of the carrier.

The electrical contacts, the control unit and the operating switch are held on a common carrier, the carrier having a first side that faces toward the battery pack, and at least one side that faces away from the battery pack. The electrical contacts are provided on the first side of the carrier, while the operating switch is held on the second side of the carrier.

Created according to an embodiment of the invention, therefore, is a function module, for putting into operation an electric motor in a battery-operated handheld work apparatus, that has all necessary electrical elements for operating a battery-operated work apparatus. All electrical elements are closely adjacent to each other. The requirement for electrical wiring can be reduced to a minimum, such that possible fault sources of the electrical wiring are minimized.

Preferably, the carrier is constituted by a circuit board that carries the control unit and that has the electrical connections between the battery pack, the control unit and the operating switch as conductor paths on the circuit board. The electrical components, such as the operating switch, the control unit and connection contacts to the battery pack may be soldered-on or soldered-in on the circuit board, such that separable contacts, such as cable lugs, are avoided. The requirement for electrical cables is minimized by the fact that the necessary electrical wiring is realized as conductor paths.

Preferably, the circuit board has a first circuit-board side that faces toward the battery pack, and a second circuit-board side that faces away from the battery pack. Both sides of the circuit board may be configured for equipping with electronic components. Expediently, the circuit board constituting the carrier is a circuit board equipped on both sides of the circuit board.

The electrical contacts for connection to the battery pack are preferably disposed on the first side of the circuit board, in particular soldered on the circuit board to conductor paths. The operating switch is provided on the second side of the circuit board, and soldered to conductor paths on the circuit board. The battery pack may be plugged directly onto the contacts of the function module held in the housing of the work apparatus, the plug connections to the battery pack advantageously being the only plug connections of the electrical wiring.

It may be advantageous to provide the control unit on a control circuit board that is realized as a further circuit board. The further circuit board may be held on the circuit board that constitutes the carrier. In an expedient configuration, the control circuit board for the control unit and the circuit board constituting the carrier are realized as a single piece and constitute a common circuit board.

In an embodiment of the invention, the electric motor is realized with an electrical braking circuit, the braking circuit including a braking resistor and an electrical braking switch. The braking switch—like the operating switch—is held on the second side of the carrier. Advantageously, the operating switch and the braking switch are directly adjacent to each other.

The braking resistor is advantageously disposed as an electrical component on the circuit board that constitutes the carrier. In particular, the braking resistor is realized as a conductor path on at least one circuit-board side of the circuit board constituting the carrier. Advantageously in this case, the lines of the electrical braking circuit are realized as conductor paths on the circuit board that constitutes the carrier. A braking circuit is thus created, that—in particular with all components and the wiring—is provided on the carrier circuit board. Plug-in contacts for the braking circuit are minimized.

The electrical contacts of the function module for connection to the battery pack are realized, expediently, as a separable plug-in connection. The circuit board constituting the carrier is held in a receiver, which may be realized, for example, as a recessed receiver. The electrical contacts extend through the base of the receiver. Expediently, the carrier circuit board is encapsulated in the receiver.

The electromechanical function module for putting into operation an electric motor in a battery-operated handheld work apparatus includes electrical contacts for electrical connection to a battery pack. The function module additionally includes an operating switch, and a control unit for putting the electric motor into operation. The operating switch is coupled to a mechanical actuating element, with the electrical contacts, the control unit and the operating switch being held on a common carrier. The carrier has a first side, on which the electrical contacts are provided, and a second side, on which the operating switch is disposed.

In a particular configuration of the invention, the carrier is constituted by a circuit board, the circuit board carrying the control unit, and the electrical connections between the electrical contacts and the operating switch being realized as conductor paths on the circuit board. The electrical contacts to the battery pack and to the electric motor are separable contacts, while all other connections of the function module are configured as fixed soldered connections of the circuit board.

In an embodiment of the invention, an electromechanical braking switch of an electrical braking circuit for the electric motor is disposed on the second side of the carrier that has the operating switch. In this case, expediently, provided on the circuit board there is a braking resistor that is realized, in particular, as a conductor path on the circuit board. Advantageously, the lines of the electrical braking circuit are also configured as conductor paths on the circuit board that constitutes the carrier.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
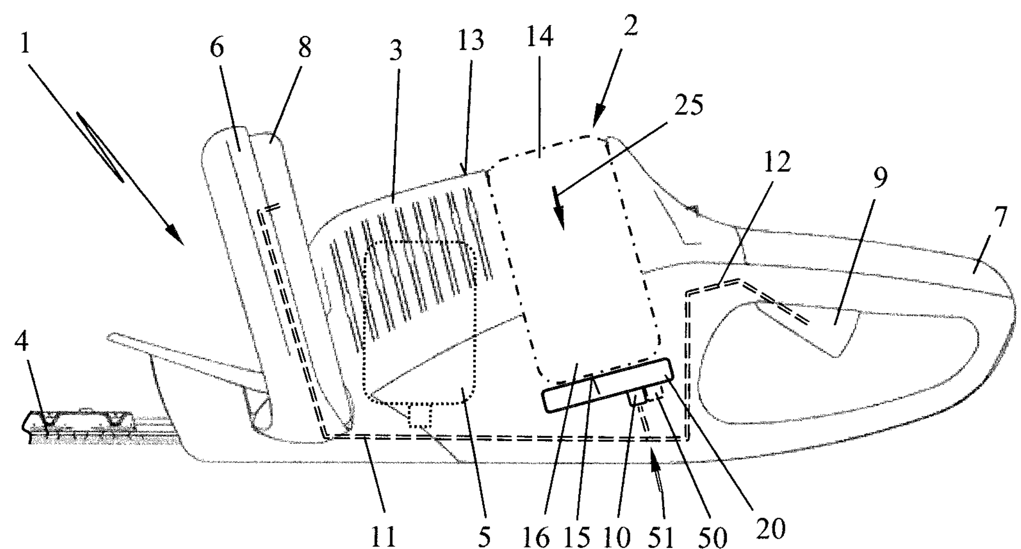
FIG. 1 shows a portable, electrical work apparatus having a battery pack in a schematic side view.

Shown schematically in FIG. 1 is a portable handheld work apparatus 1, which, in the embodiment, is represented as a hedge trimmer. The work apparatus 1 is a battery-operated electrical work apparatus 1, a battery pack 2 being inserted in the housing 3 of the work apparatus 1. The tool 4 of the work apparatus 1 is driven by an electric motor 5, which in FIG. 1 is represented by a broken line.

The work apparatus 1 has a front handle 6 and a rear handle 7. In the embodiment shown, an actuating element 9 for an electrical operating switch 10 is provided in the rear handle 7. Correspondingly, provided in the front handle 6 there is an actuating element 8 that, advantageously, likewise acts on the operating switch 10. Expediently, the actuating elements 8 and 9 act on the operating switch 10 according to the principle of a so-called two-hand control; the operative connections 11 and 12 between the actuating elements 8 and 9 and the operating switch 10 are represented schematically by broken lines in FIG. 1.

The work apparatus represented may also be realized, for example, as a battery-operated blower, a battery-operated brushcutter, a battery-operated hedge trimmer, or similar battery-operated work apparatus.

As also shown by FIG. 1, a first end 16 of the battery pack 2 lies inside the housing 3, while the second end 14 of the battery pack lies approximately on a plane with the top side 13 of the housing.

The inserted battery pack 2, in particular the first end 16 of the battery pack 2, has a contact side 15, which lies facing toward a function module 20. The function module 20 has, as power contacts, electrical contacts 21, 22 for electrical connection to the battery pack 2; there are contact sockets 23 and 24 assigned to the electrical contacts 21 and 22. The electrical contacts 21/22, together with the contact sockets 23/24, constitute the power connection between the battery pack 2 and the function module 20.

Figure 2:
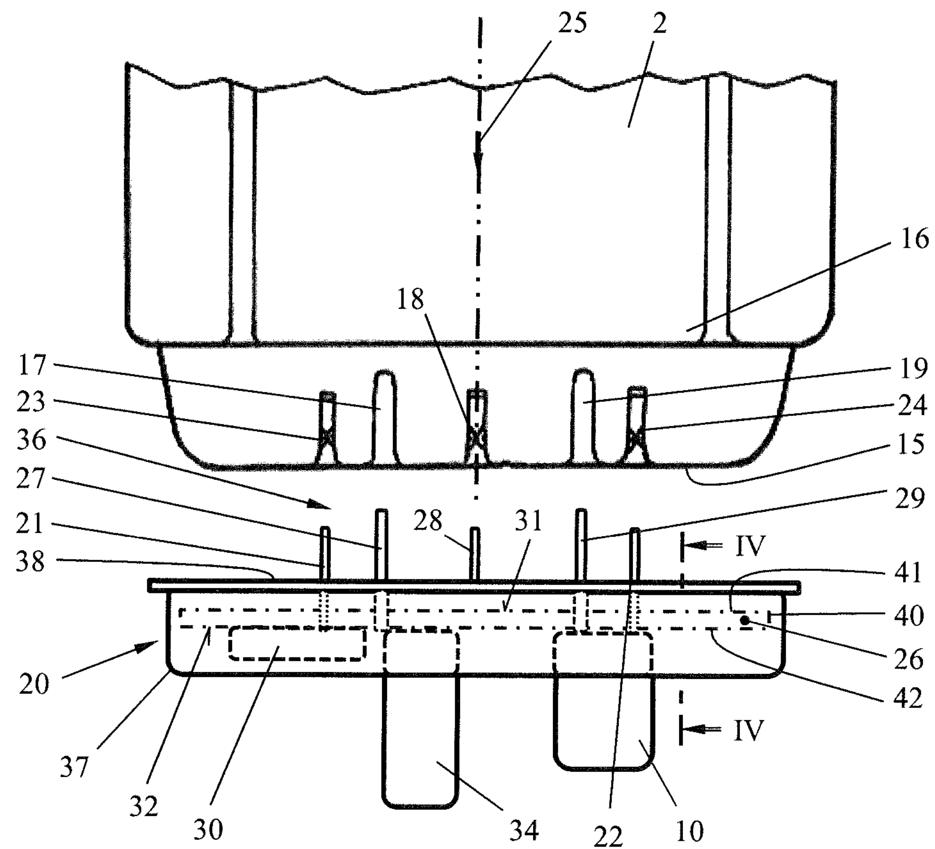
FIG. 2 shows a schematic representation of an electromechanical function module for contacting to the battery pack according to FIG. 1.

The function module 20 additionally has positioning elements 27, 29, assigned to which there are positioning receivers 17, 19 on the contact side 15 of the battery pack 2. In addition, at least one communication contact 28 is provided on the function module 20; there is a corresponding contact socket 18, in the contact side 15 of the battery pack 2, opposite the communication contact 28. The power contacts 21, 22, together with the contact sockets 23, 24, likewise constitute a plug-in connection 36, like the communication contact 28 with the contact socket 18 assigned thereto. Upon insertion of the battery pack 2 into the device slot of the housing 3, in the arrow direction 25, on the one hand the electrical power contacts 21, 22 are inserted in the contact sockets 23, 24 and, on the other hand, the communication contact 28 is inserted in the corresponding contact socket 18, making an electrical connection to the function module 20. The positioning elements 27, 29, to which the positioning receivers 17, 19 are assigned, are provided to securely align the contact sockets 18, 23 and 24 in relation to the power contacts 21, 22 and the communication contact 28. As shown by FIG. 2, the positioning elements 27, 29 are longer than the power contacts 21, 22, or the communication contact 28, such that the positioning elements 27, 29 are the first to engage with the contact side 15 of the battery pack 2.

The function module 20 has the electrical contacts 21, 22 for power transfer, the communication contact 28 and, expediently, the positioning elements 27, 29. The function module 20 additionally includes an operating switch 10 and a control unit 30 for putting the electric motor 5 into operation and operating the latter.

As shown, in particular, by FIG. 2, the electrical contacts 21, 22, the communication contact 28, the control unit 30 and the operating switch 10 are held on a common carrier 40. The carrier 40 has a first side 41, which faces toward the battery pack 2 and which may also be referred to as the front side of the carrier 40. The battery pack 2 additionally has a second side 42, which faces away from the battery pack 2 and which may also be referred to as the back side of the carrier 40.

Figure 3:
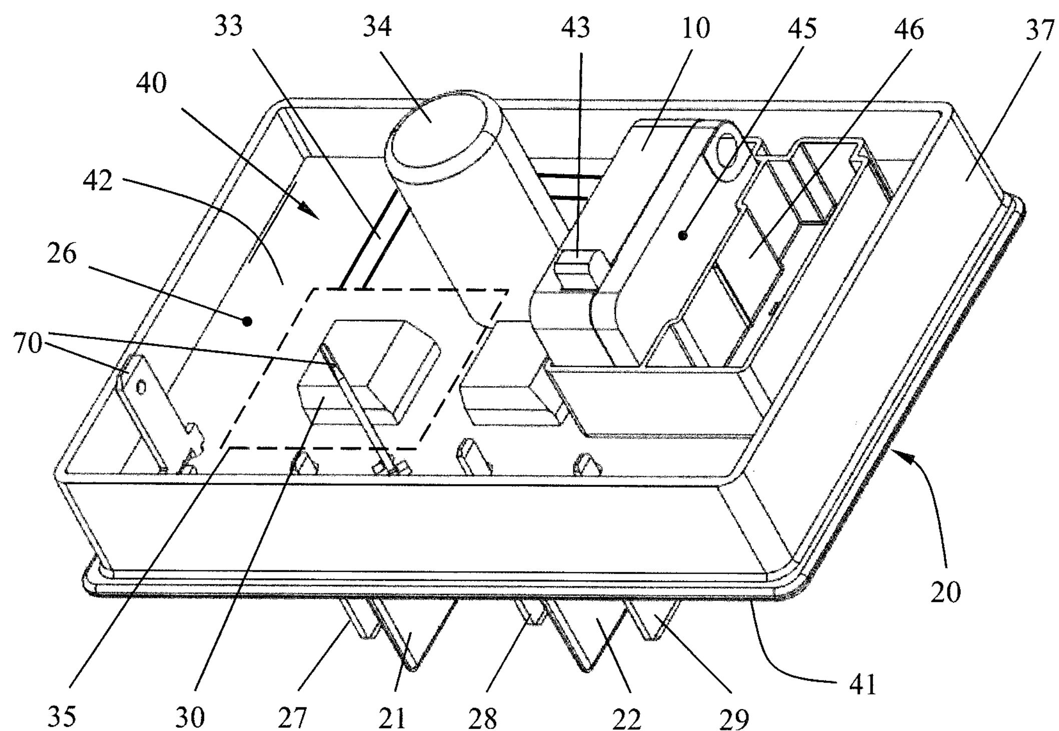
FIG. 3 is an isometric view of the function module according to FIG. 2.

As also shown by FIG. 3, the carrier 40 is advantageously constituted by a circuit board 26. The circuit board 26 carries the control unit 30, with the electrical connections between the battery pack 2, the control unit 30 and the operating switch 10 being realized as conductor paths 33 on the circuit board 26.

The circuit board 26 constituting the carrier 40 may be a circuit board that is equipped on both sides. A first circuit-board side 31 that faces toward the battery pack 2 may likewise serve to receive electronic components 34, like a second circuit-board side 32, which faces away from the battery pack 2. In the embodiment shown, in particular the control unit 30 and one or more electronic components 34 are provided on the second circuit-board side 32.

The contacts 21, 22 and the communication contact 28 for electrical connection to the battery pack 2 are provided—as shown by FIG. 2—on the first circuit-board side 31, The contacts 21, 22 and the communication contact 28 are located on the first side 41, the front side of the carrier 40. The electrical operating switch 10 is disposed on the second circuit-board side 32 of the circuit board 26, which faces away from the battery pack 2. The operating switch 10 is thus located on the second side 42 of the carrier 40, on a so-called back side of the carrier 40. Flat contacts 70, for terminal connection of the electric motor 5, are also provided on the second circuit-board side 32.

Figure 5:
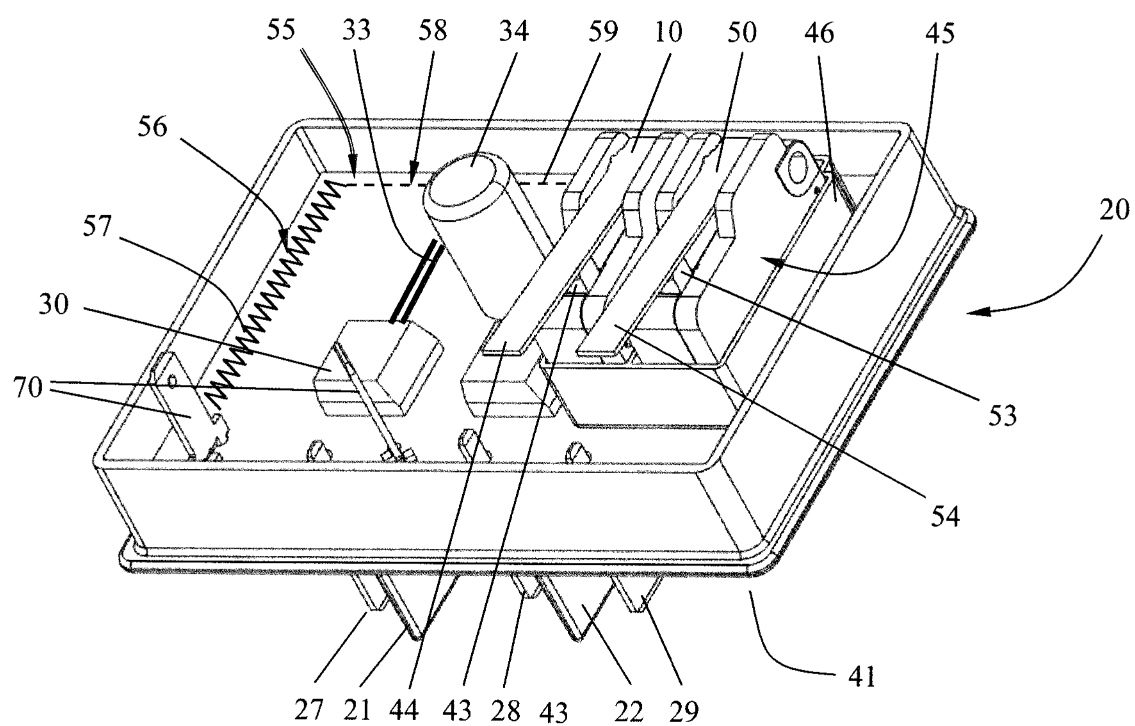

In FIG. 3, the control unit 30 is provided on the circuit board 26 that constitutes the carrier 40. It may be expedient for the control unit 30 to be disposed on a control circuit board 35 that constitutes a further circuit board. The control circuit board 35 is fixed on the circuit board 26 that constitutes the carrier 40, and electrically connected to the latter; expediently, the circuit board 26, constituting the carrier 40, and the control circuit board 35 are disposed on a common circuit board, as shown by FIGS. 3 and 5.

The function module 20 thus includes the operating switch 10 and the control unit 30 for putting the electric motor 5 into operation. The operating switch 10 is coupled to a mechanical actuating element 9 and/or to a mechanical actuating element 8. The operative connections 11, 12 of the coupling may be configured as a two-hand control, that is to put the electric motor 5 into operation, the actuating element 9 and the actuating element 8 must be depressed. It is only depression of both actuating elements 8 and 9 that results in a travel of the operating switch 10, in the arrow direction 51 (FIG. 1), and thus in switching-on of the latter.

FIG. 3 shows the function module 20, in which the electrical contacts 21, 22 and the communication contact 28, together with the control unit 30 and the operating switch 10, are held on the common carrier 40. On the first side 41, the carrier 40 has at least the electrical contacts 21, 22 and the communication contact 28. At least the operating switch 10 is provided on the second side 42 of the carrier 40.

The carrier 40 is constituted by the circuit board 26, with—cf. FIG. 3—the electrical connections between the electrical contacts 21, 22, the communication contact 28 and the operating switch 10, and the control unit 30, being realized as conductor paths 33 on the circuit board 26.

In an embodiment of the invention, according to FIG. 5, the function module 20, besides having the operating switch 10, has an electrical braking switch 50, which is disposed on the second side 42 of the carrier 40. Preferably, the operating switch 10 and the braking switch 50 are closely adjacent to each other. Expediently, the operating switch 10 and the braking switch 50 are held in a common mounting base 46.

The braking switch 50 is assigned to a braking circuit 55 that includes a braking resistor 56. In the embodiment, the braking resistor 56 is realized as a conductor path 57 on the circuit board 26. Advantageously, the lines 58 of the electrical braking circuit 55 are also integrated, as conductor paths 59, on the circuit board 26.

As shown by FIG. 5, the operating switch 10 and/or the braking switch 50 are/is preferably realized as an electromechanical switch, in particular as a microswitch 45, the mechanical coupling of the operative connections 11 and 12 of the actuating elements 8 and 9 engaging with the switching lugs 44, 54. A switching lug 44, 54 acts on an actuating pin 43, 53. The switching lugs 44, 54 are preferably elastic. Contactless switches, such as reed contacts, Hall sensors or suchlike proximity switches may also be used as an operating switch 10 and/or braking switch 50.

The electrical contacts 21, 22 and the communication contact 28 for connection to the battery pack 2 are realized as separable plug-in connections 36, as shown by FIG. 2.

Figure 4:
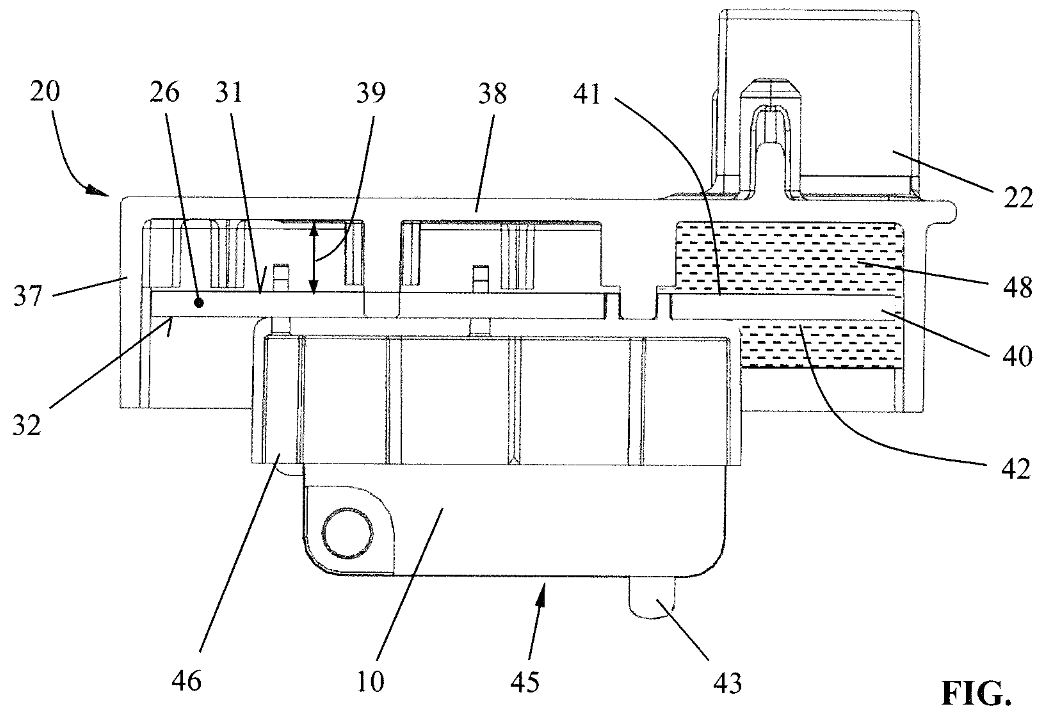
FIG. 4 shows a section through the function module, along the line IV-IV in FIG. 2; and, FIG. 5 shows a view of the function module according to FIG. 3, with an operating switch and a braking switch.

The circuit board 26 constituting the carrier 40 is held in a receiver 37 that constitutes a type of recessed receiver. The electrical contacts 21, 22 and the communication contact 28 extend through the base 38 of the receiver 37. The circuit board 26 of the carrier 40 is at a distance 39 from the base 38. Preferably, the configuration is configured in such a manner that the circuit board 26 of the carrier 40 is encapsulated in the receiver 37. The encapsulating compound 48 is shown in part in FIG. 4.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
an electric motor configured to drive a work tool;
a plurality of electrical contacts configured to establish an electrical connection to a battery pack;
an electric operating switch configured to start said electric motor;
an actuating member coupled to said operating switch via an operative connection configured so as to operate mechanically on said operating switch;
a control unit for operating said electric motor;
a carrier;
said electrical contacts, said control unit and said operating switch being jointly arranged on said carrier;
said carrier having a first side facing the battery pack and at least one second side facing away from said battery pack;
said electrical contacts being provided on said first side of said carrier;
said operating switch being held at least partially on said second side of said carrier;
said carrier is formed by a circuit board;
said circuit board carries said control unit; and,
said control unit, said operating switch and the battery pack have electrical connections therebetween formed as conductor paths on said circuit board.

2. The handheld work apparatus of claim 1, wherein:
said circuit board has a first circuit board side configured to face the battery pack and to accommodate electronic components;
said circuit board further has a second circuit board side configured to face away from the battery pack and to accommodate electronic components;
said electrical contacts are arranged on said first circuit board side; and,
said operating switch is held on said second circuit board side.

3. The handheld work apparatus of claim 1, wherein:
said carrier is formed by a circuit board;
said control unit is formed on a control circuit board as a further circuit board.

4. The handheld work apparatus of claim 1, wherein said electric motor is formed with an electrical braking circuit having a braking resistor and an electric braking switch.

5. The handheld work apparatus of claim 4, wherein said braking switch is held on said second side of said carrier.

6. The handheld work apparatus of claim 4, wherein:
said carrier is formed by a circuit board; and,
said braking resistor is formed as an electrical component on said circuit board of said carrier.

7. The handheld work apparatus of claim 6, wherein:

said circuit board has a first side and a second side; and, said braking resistor is formed as a conductor path on at least one of said first side and said second side of said circuit board of said carrier.

8. The handheld work apparatus of claim 6, wherein said electrical braking circuit includes electrical lines formed as conductor paths on said circuit board.

9. The handheld work apparatus of claim 1, wherein said plurality of electrical contacts are configured as plug-in connections.

10. The handheld work apparatus of claim 2 further comprising:

a receiver; and, said circuit board being held and potted in said receiver.

11. The handheld work apparatus of claim 10, wherein:

said receiver has a base; and, said electrical contacts project through said base.

12. The handheld work apparatus of claim 1, wherein said operating switch is configured as an electromechanical switch.

13. The handheld work apparatus of claim 1, wherein said operating switch is configured as a proximity switch.

14. A handheld work apparatus comprising:

an electric motor configured to drive a work tool;

a battery pack;

a plurality of electrical contacts configured to establish an electrical connection to said battery pack;

an electric operating switch configured to start said electric motor;

an actuating member coupled to said operating switch via an operative connection configured so as to operate mechanically on said operating switch;

a control unit for operating said electric motor;

a printed circuit board defining a carrier;

said electrical contacts, said control unit and said operating switch being jointly arranged on said carrier;

said carrier having a first side facing the battery pack and a second side facing away from said battery pack;

said electrical contacts being provided on said first side of said carrier;

said operating switch being held at least partially on said second side of said carrier;

said battery pack having a first end facing toward said first side of said carrier and having electrical contact sockets formed in said first end; and, said electrical contacts projecting upwardly from said first side of said carrier so as to engage corresponding ones of said electrical contact sockets and so provide a direct electrical connection to said printed circuit board from said battery pack.

15. The handheld work apparatus of claim 14 further comprising positioning elements assigned to said circuit board and said positioning elements being configured to be longer than said electrical contacts; and, said battery pack having positioning receptacles formed therein for receiving corresponding ones of said positioning elements to securely align said electrical contact sockets in relation to said electrical contacts when connecting said battery pack to said printed circuit board.

* * * * *

UNITED STATES PATENT AND TRADEMARK OFFICE

CERTIFICATE OF CORRECTION

PATENT NO. : 10,819,192 B2
APPLICATION NO. : 15/461415
DATED : October 27, 2020
INVENTOR(S) : Gurr et al.

It is certified that error appears in the above-identified patent and that said Letters Patent is hereby corrected as shown below:

In the Claims

In Column 6:
Line 56: delete "said carrier is formed by a circuit board;".

Signed and Sealed this
Twenty-second Day of December, 2020

Andrei Iancu
*Director of the United States Patent and Trademark Office*